United States Patent [19]

Schütze et al.

[11] 4,190,726
[45] Feb. 26, 1980

[54] POLYCYCLIC DYESTUFFS

[75] Inventors: Detlef-Ingo Schütze, Bergisch-Gladbach; Klaus Wunderlich, Leverkusen, both of Fed. Rep. of Germany

[73] Assignee: Bayer Aktiengesellschaft, Leverkusen, Fed. Rep. of Germany

[21] Appl. No.: 915,020

[22] Filed: Jun. 13, 1978

[30] Foreign Application Priority Data

Jun. 15, 1977 [DE] Fed. Rep. of Germany ....... 2726902

[51] Int. Cl.² .......................................... C07D 471/22
[52] U.S. Cl. ....................................... 546/27; 546/32; 546/41; 8/1 D; 260/37 N; 260/40 R; 260/42.52; 260/42.43
[58] Field of Search .............. 260/287 P, 282; 546/27, 546/32, 41

[56] References Cited

U.S. PATENT DOCUMENTS

| | | | |
|---|---|---|---|
| 1,627,738 | 5/1927 | Holl et al. | 546/27 |
| 2,861,073 | 11/1958 | Eckert | 546/27 |
| 3,920,662 | 11/1975 | Troster | 260/287 P |

FOREIGN PATENT DOCUMENTS 457671 8/1968 Switzerland .
341357 1/1931 United Kingdom .

*Primary Examiner*—David Wheeler
*Attorney, Agent, or Firm*—Sprung, Felfe, Horn, Lynch & Kramer

[57] ABSTRACT

In spite of their pigment character, dyestuffs of the formula

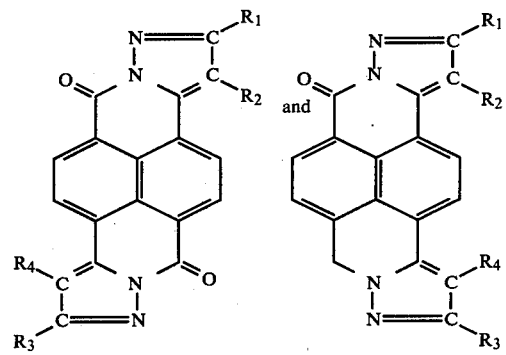

are outstandingly suitable for dyeing synthetic fibres, in particular polyester fibres, by customary methods, strong yellow dyeings with good fastness to light and sublimation being obtained. In the abovementioned formula:

$R_1$ and $R_3$ denote hydrogen, alkyl, aralkyl, alkoxyalkyl, alkoxycarbonyl, alkoxycarbonylalkyl or aryl, $R_2$ and $R_4$ denote alkylcarbonyl, arylcarbonyl, alkoxycarbonyl, —CN or —$CONX_1X_2$, $X_1$ denotes hydrogen, alkyl, aralkyl, aryl or cycloalkyl and $X_2$ denotes hydrogen or alkyl.

4 Claims, No Drawings

POLYCYCLIC DYESTUFFS

The invention relates to mixtures of polycyclic dyestuffs of the formula

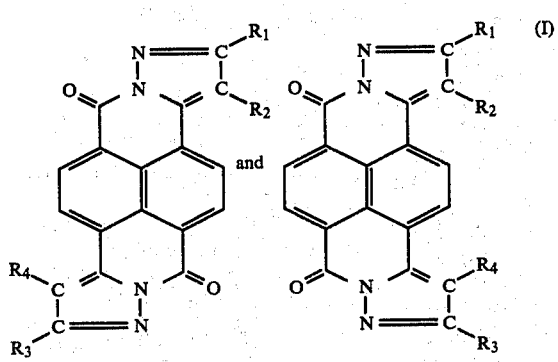

wherein
$R_1$ represents hydrogen, alkyl, aralkyl, alkoxyalkyl, alkoxycarbonyl, alkoxycarbonylalkyl or aryl,
$R_2$ represents alkylcarbonyl, arylcarbonyl, alkoxycarbonyl, —CN or —$CONX_1X_2$,
wherein
$X_1$ denotes hydrogen, alkyl, aralkyl, aryl or cycloalkyl and
$X_2$ denotes hydrogen or alkyl, and
$R_3$ and $R_4$ preferably, but not necessarily, have the same meaning as $R_1$ and $R_2$ respectively,
and wherein the abovementioned alkyl, alkoxy, aralkyl, aryl and cycloalkyl radicals and the benzene rings contained in the polycyclic base molecule can contain further substituents which are customary in dyestuff chemistry and preferably are nonionic, and optionally carboxyl radicals, and their preparation and use.

The alkyl and alkoxy radicals mentioned above in any connection generally contain 1-20 C atoms, preferably 1-4 C atoms, and can be substituted, for example by a OH, CN or $C_1$-$C_4$-alkoxy group or halogen.

Suitable aralkyl radicals are benzyl and phenylethyl radicals. Suitable aryl radicals are, above all, phenyl radicals which, for example, can be monosubstituted to trisubstituted by $C_1$-$C_4$-alkyl, $C_1$-$C_4$-alkoxy, halogen or $NO_2$.

Suitable cycloalkyl radicals are, above all, cyclohexyl radicals. Within the scope of this invention, "halogen" is to be understood as fluorine, bromine and, above all, chlorine.

Preferred alkyl and alkoxy radicals are methyl and methoxy or ethoxy.

"Bulky" radicals (such as, for example, "tert.-butyl") are in those positions where they cause no steric hindrance (for example in the m-position and p-position of a phenyl radical).

Particularly valuable dyestuffs according to the invention are those of the formula (I) wherein
$R_1$ represents $C_1$-$C_4$-alkyl and
$R_2$ represents $C_1$-$C_4$-alkoxycarbonyl, $CONH_2$, $CONHY_1$ or $CONY_1Y_2$,
wherein
$Y_1$ and $Y_2$ denote $C_1$-$C_4$-alkyl,
and wherein
$R_3$ and $R_4$ have the same meaning as $R_1$ and $R_2$ respectively.

Very particularly preferred dyestuffs are those of the formula (I) wherein
$R_1$ and $R_3$ represent $C_1$-$C_4$-alkyl and
$R_2$ and $R_4$ represent $C_1$-$C_4$-alkoxycarbonyl.

The new dyestuffs are obtained, for example, by a process in which compounds of the formula

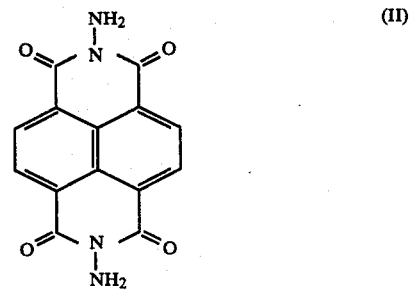

wherein the benzene radicals can be optionally substituted, are subjected to a cyclising condensation reaction with a total of at least 2 equivalents of the compounds of the formula

or mixtures of (IIIa) and compounds of the formula

in a manner which is in itself known (compare DT-OS (German Published Specification) No. 2,238,378, corresponding to U.S. Patent No. 3,920,662).

The reaction is preferably carried out with compounds of the formula (IIIa).

In these reactions, the corresponding hydrazones are first formed and are then cyclised in the presence of basic condensing agents at elevated temperatures (80°-200° C.).

The starting compounds of the formula (II) are known (compare Chem. and Ind. 1967, page 1,565-1,566) or can be prepared in a manner which is in itself known by subjecting naphthalenetetracarboxylic acid or its dianhydride to a condensation reaction with hydrazine in inert organic solvents, such as alcohols or acid dialkylamides, or also in glacial acetic acid at temperatures of 120° C.

Examples of suitable carbonyl compounds of the formula (III) are acetoacetic acid methyl, ethyl, isopropyl, butyl and 2-ethoxy-ethyl ester, γ-diethylacetoacetic acid ethyl ester, phenylacetoacetic acid ethyl ester, benzoylacetoacetic acid ethyl ester (optionally substituted), oxaloacetic acid diethyl ester, acetylacetone, benzoylacetone, γ-dimethylacetylacetone, dibenzoylmethane, γ-ethoxyacetylacetone, acetyl- and benzoylpyruvic acid ethyl ester, acetonedicarboxylic acid dimethyl ester, benzoylacetonitrile, formylacetophenone, acetoacetamide, acetoacetic acid methylamide and diethylamide, acetoacetanilide (optionally substituted), acetoacetic acid cyclohexylamide and cyclooctylamide and benzoylacetamide.

The condensation of the carbonyl compound of the formula (III) with the compound of the formula (II) to give the corresponding hydrazones is carried out in the presence of acid catalysts (about 0.01 to 0.1 mol per mol of hydrazone). Suitable acid condensing agents are fatty acids, aromatic sulphonic acids, preferably benzenesulphonic or toluenesulphonic acid, alkanesulphonic acids and mineral acids, such as sulphuric acid, phosphoric acid or HCl gas.

Solvents which can be used are either organic solvents which are inert under the reaction conditions, such as, for example, ethanol, isobutanol, monomethylglycol, acetic acid, chlorobenzene, dichlorobenzene, nitrobenzene, dimethylformamide or N-methylpyrrolidone, or an excess of the carbonyl compound.

If solvents which have an acid action are used, such as, for example, fatty acids, the addition of acid catalysts is of course unnecessary.

The reaction temperatures are between 60° C. and about 200° C. The reaction can optionally also be carried out under pressure.

The reaction times are between 30 minutes and 15 hours. The water of reaction formed during the reaction is appropriately removed from the reaction mixture by distillation. The hydrazone formed is isolated in the customary manner.

The cyclisation of the hydrazone to give the pyrazole of the formula (I) is appropriately carried out in an organic solvent. Suitable solvents are higher alcohols, such as butanol and isobutanol, or pyridine, dimethylsulphoxide or, preferably, acid dialkylamides, such as dimethylformamide, dimethylacetamide or N-methylpyrrolidone.

Suitable basic catalysts are sodium acetate, carbonate or hydroxide or potassium acetate, carbonate or hydroxide, piperidine, morpholine or triethylamine.

The reaction temperatures during the cyclisation are between 60° C. and the boiling point of the particular solvent used.

However, the hydrazone can also optionally be prepared in one of these solvents mentioned and reacted directly, without intermediate isolation and by neutralising the acid condensing agent, with one of the bases mentioned to give the dyestuffs of the formula (I). The dyestuffs are then likewise isolated in the customary manner.

The new dyestuffs of the formula (I) are outstandingly suitable for dyeing organic materials, in particular for dyeing and/or printing fibres, filaments, woven fabrics, knitted fabrics, silvers, films or sheets, but above all for dyeing and printing hydrophobic fibre materials. They are dyed or printed by the methods customary for the fibres.

Some types of the dyestuffs according to the invention are also suitable for dyeing synthetic fibre materials from organic solvents.

Strong, brilliant, yellow dyeings with good fastness properties, in particular outstanding fastness to light and sublimation, are obtained according to the abovementioned processes on the fibres mentioned using the dyestuffs of the formula (I).

Furthermore, the dyestuffs of the formula (I) are suitable for the bulk dyeing of plastics, such as polycarbonates, polymethacrylates, polyamides, polyolefines, polystyrene and, in particular, linear synthetic polyesters. Bulk dyeing is understood here as the addition of the dyestuffs before, during or after the polymerisation but before the final shaping.

It is also possible to add the dyestuffs to the monomeric starting materials for the plastics and then to polymerise the monomers in the presence of polymerisation catalysts. Shaped articles of any desired form are obtained in strong yellow shades with good fastness properties.

EXAMPLE 1

(a) 12 g of N,N'-diamino-naphthalenetetracarboxylic acid diimide are heated, together with 140 g of acetoacetic acid ethyl ester and 0.5 g of p-toluenesulphonic acid, to 130° C. in the course of 2 hours and the mixture is stirred at 130° C. for 2.5 hours. It is then stirred until cold, diluted with 120 ml of methanol and stirred for a further 0.5 hour and the precipitate is filtered off, washed with methanol and dried.

20 g of the corresponding hydrazone of acetoacetic acid ethyl ester are obtained in a yield of 95% of theory.

(b) 20 g of the hydrazone obtained according to (a) are heated under reflux in 80 ml of dimethylformamide for 5 hours, 0.2 g of anhydrous sodium acetate being added. Thereafter, the mixture is cooled to 80° C., diluted with 100 ml of methanol and cooled to room temperature and the precipitate is filtered off. It is washed with methanol and dried.

16.8 g, which corresponds to 90% of theory, of the dyestuff isomer mixture of the formula

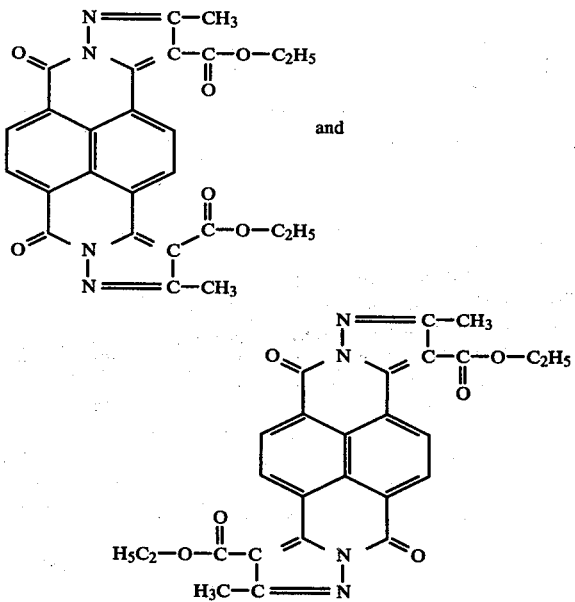

are obtained.

The dyestuff dyes polyester fabric in brilliant reddish-tinged yellow shades of very good fastness to light and sublimation.

EXAMPLE 2

(a) 10 g of N,N'-diamino-naphthalenetetracarboxylic acid diimide, 90 g of acetoacetic acid methyl ester and 0.5 g of p-toluenesulphonic acid are stirred at 130° C. for 1.5 hours. The mixture is then cooled to 70° C., diluted with 100 ml of methanol and cooled to room temperature and the precipitate is filtered off, washed with methanol and dried. 15.4 g of the corresponding hydrazone of acetoacetic acid methyl ester are obtained in a yield of 92.5% of theory.

(b) 15.4 g of the hydrazone obtained according to (a) are stirred under reflux in 70 ml of dimethylformamide for 40 minutes, 0.2 g of anhydrous potassium acetate being added. The mixture is then stirred until cold and diluted with 100 ml of ethanol and the precipitate is filtered off, washed with ethanol and dried.

12.9 g, which corresponds to 90.5% of theory, of the dyestuff isomer mixture of the formula

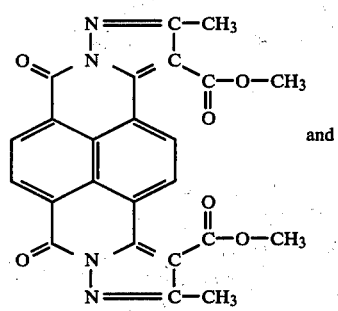

and

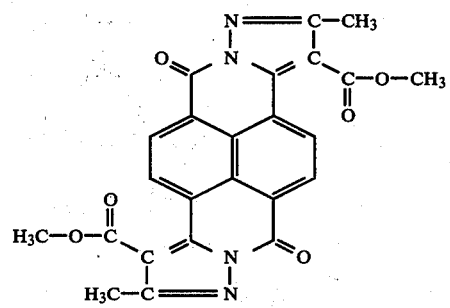

are obtained.

The dyestuff dyes polyester fabric in brilliant reddish-tinged yellow shades of very good fastness to light and sublimation.

EXAMPLE 3

(a) 10 g of N,N'-diamino-naphthalenetetracarboxylic acid diimide, 24 g of acetoacetic acid ethyl ester and 0.2 g of p-toluenesulphonic acid are heated to 125° C. in 80 ml of o-dichlorobenzene in the course of 40 minutes and the mixture is stirred at this temperature for 20 minutes. It is then cooled to 70° C., 80 ml of methanol are added and the precipitate is filtered off at room temperature. It is washed with methanol and dried. 15.4 g of the hydrazone, which corresponds to that in Example 1(a), are obtained in a yield of 88% of theory.

(b) The hydrazone obtained according to (a) is further processed further, analogously to the instructions 1(b), to give the dyestuff isomer mixture.

EXAMPLE 4

10 g of N,N'-diamino-naphthalenetetracarboxylic acid diimide, 36 g of acetoacetic acid ethyl ester and 0.3 g of p-toluenesulphonic acid are warmed under reflux in 100 ml of isobutanol for 8 hours. The mixture is then cooled to room temperature, 36 g of anhydrous potassium acetate are added and the mixture is again heated to the boil. After one hour at the reflux temperature, 20 g of potassium carbonate are added, the mixture is stirred for a further hour and then cooled to room temperature, 150 ml of methanol are added and the precipitate is filtered off. It is washed with methanol and water and dried.

13.7 g of the dyestuff isomer mixture are obtained, analogously to Example 1(b), in a yield of 84% of theory.

EXAMPLE 5

(a) 20 g of N,N'-diamino-naphthalenetetracarboxylic acid diimide are stirred under reflux in 180 g of acetylacetone for 6 hours, 0.5 g of p-toluenesulphonic acid being added. The mixture is then cooled and 150 ml of methanol are added. The precipitate is filtered off at room temperature, washed with methanol and dried.

28.5 g of the corresponding hydrazone of acetylacetone are obtained in a yield of 92% of theory.

(b) 28.5 g of the hydrazone obtained according to (a) are stirred at 130° C. in 100 ml of N-methylpyrrolidone with 0.5 g of anhydrous sodium acetate for 2 hours. The mixture is then cooled, 200 ml of methanol are added and the precipitate is filtered off. It is washed with methanol and dried.

24.4 g, which corresponds to 93% of theory, of the dyestuff isomer mixture of the formula

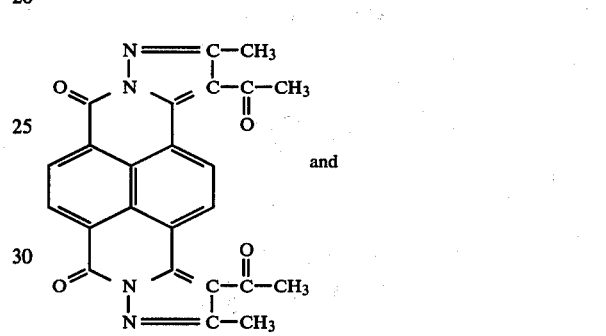

and

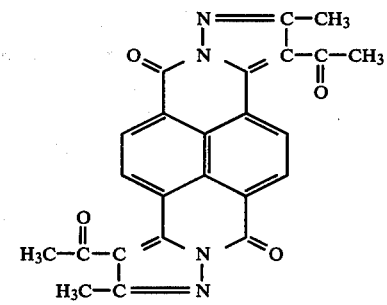

are obtained.

The dyestuff dyes polyester fabric in brilliant, reddish-tinged yellow shades which are fast to light.

EXAMPLE 6

(a) 20 g of N,N'-diamino-naphthalenetetracarboxylic acid diimide, 70 g of acetylacetone and 1 g of p-toluenesulphonic acid are stirred in 100 ml of isobutanol and the mixture is kept at the boil for 12 hours. It is then stirred until cold and the precipitate is filtered off, washed with methanol and dried.

27.7 g of the corresponding hydrazone of acetylacetone are obtained in a yield of 89% of theory.

(b) 27.7 g of the hydrazone obtained according to (a) are stirred under reflux in 220 ml of isobutanol with 0.4 g of anhydrous potassium acetate for 2 hours. Thereafter, the precipitate is filtered off at room temperature, washed with methanol and dried.

25.4 g, that is to say 99% of theory, of the dyestuff isomer mixture already described in Example 5 are obtained.

EXAMPLE 7

(a) A mixture of 10 g of N,N'-diamino-naphthalenetetracarboxylic acid diimide, 106 g of acetoacetanilide and 0.2 g of p-toluenesulphonic acid is melted and stirred at 150° C. for 7 hours. It is then cooled to 70° C., 100 ml of methanol are added and the precipitate is filtered off at room temperature. It is washed with methanol and water and dried.

19.4 g of the corresponding hydrazone of acetoacetanilide are obtained in a yield of 93.5% of theory.

(b) 19.4 g of the hydrazone obtained according to (a) are heated under reflux in 90 ml of dimethylformamide for 4 hours, 0.3 g of anhydrous potassium acetate being added. Thereafter, the mixture is diluted with 100 ml of methanol at 70° C. and cooled to room temperature and the precipitate is filtered off, washed with methanol and dried.

17.7 g, which corresponds to 96.9% of theory, of the dyestuff isomer mixture of the formula

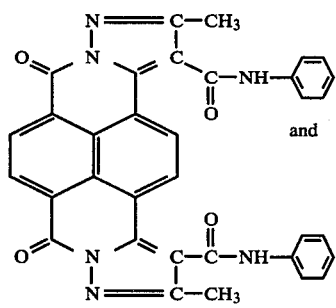

and

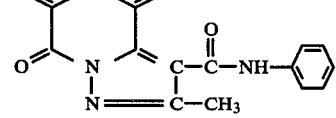

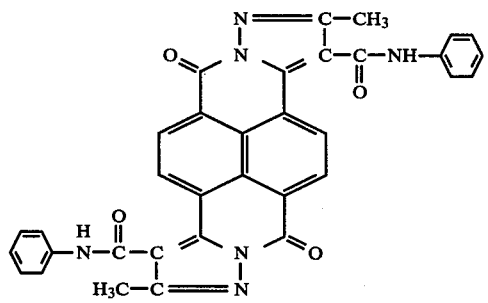

are obtained.

The dyestuff dyes polyester fabric in yellow shades of very good fastness to light and sublimation.

EXAMPLE 8

(a) 10 g of N,N'-diamino-naphthalenetetracarboxylic acid diimide, 56 g of acetonedicarboxylic acid dimethyl ester and 0.5 g of p-toluenesulphonic acid are heated to 130°–140° C. in 150 ml of chlorobenzene. The mixture is stirred for 10 hours at this temperature. It is then diluted with 100 ml of methanol at 70° C. and the precipitate is filtered off at room temperature. It is washed with methanol and dried.

18 g of the corresponding hydrazone are obtained in a yield of 87.6% of theory.

(b) 18 g of the hydrazone obtained according to (a) are stirred at 140°–145° C. in 100 ml of dimethylformamide for 8 hours, 0.7 g of anhydrous potassium acetate being added. The mixture is then diluted with 100 ml of ethanol at 60° C., stirred until cold and subsequently stirred at room temperature for a further 2 hours. The precipitate is then filtered off, washed with ethanol and dried.

15.8 g, which corresponds to 93% of theory, of the dyestuff isomer mixture of the formula

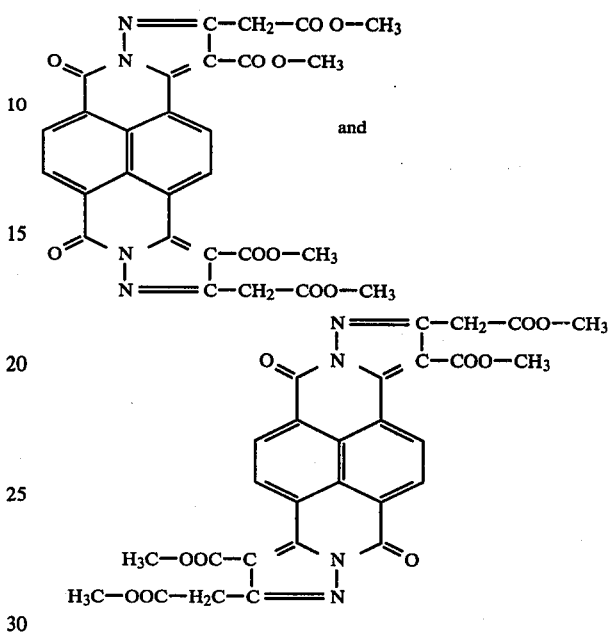

are obtained.

The dyestuff dyes polyester in brilliant yellow shades of very good fastness to light and sublimation.

EXAMPLE 9

(a) 10 g of N,N'-diamino-naphthalenetetracarboxylic acid diimide are heated to 150° C., together with 0.5 g of p-toluenesulphonic acid, in 150 g of benzoylacetic acid ethyl ester and the mixture is stirred at this temperature for 8 hours. Thereafter, it is diluted with 200 ml of methanol at 70° C. and the precipitate is filtered off at room temperature, washed with methanol and dried.

19.9 g of the corresponding hydrazone of benzoylacetic acid ethyl ester are obtained, which corresponds to a yield of 91.5% of theory.

(b) 19.9 g of the hydrazone obtained according to (a) are heated to the boil in 120 ml of dimethylformamide, 0.4 g of anhydrous sodium acetate being added. After 11 hours, the mixture is cooled, 150 ml of methanol are added and the precipitate is filtered off at room temperature. It is washed with methanol and dried.

17.3 g, which corresponds to 92% of theory, of the dyestuff isomer mixture of the formula

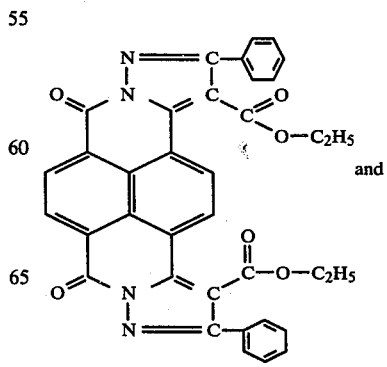

and

-continued

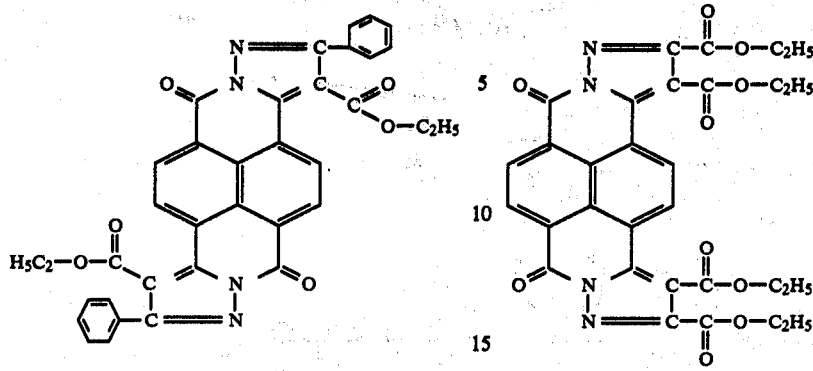

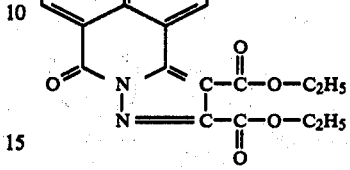

and are obtained.

The dyestuff dyes polyester fabric in brilliant yellow shades of very good fastness to light and sublimation.

EXAMPLE 10

(a) 10 g of N,N'-diamino-naphthalenetetracarboxylic acid diimide are warmed to 110° C. in 120 g of oxaloacetic acid diethyl ester, 0.5 g of p-toluenesulphonic acid being added, and the mixture is stirred at this temperature for 6 hours. It is then diluted with 100 ml of ethanol at 70° C. and the precipitate is filtered off at room temperature and dried.

19.1 g of the corresponding hydrazone are obtained in a yield of 88.9% of theory.

(b) 19.1 g of the hydrazone obtained according to (a) are heated to the boil in 100 ml of dimethylformamide for 7 hours, 0.3 g of anhydrous sodium acetate being added. Thereafter, the mixture is diluted with 100 ml of ethanol at 70° C. and the precipitate is filtered off at room temperature. After washing with ethanol, the precipitate is dried.

16.2 g, which corresponds to 89.9% of theory, of the dyestuff isomer mixture of the formula

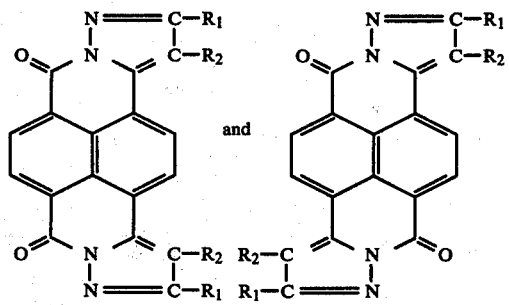

are obtained.

The dyestuff dyes polyester fabric in brilliant yellow shades of very good fastness to light and sublimation.

EXAMPLES 11-35

The examples listed in the Table which follows are obtained according to the procedures described above:

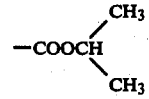

| Example | R₁ | R₂ | Colour shade (polyester) |
|---|---|---|---|
| 11 | —CH₃ | 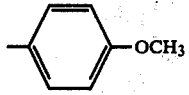 | reddish-tinged yellow |
| 12 | —CH₃ | —COOC₄H₉ | " |
| 13 | —CH₃ | —COO(CH₂)₁₁CH₃ | " |
| 14 | —C₂H₅ | —COOC₂H₅ | " |
| 15 | —⟨C₆H₄⟩—OCH₃ | —COOC₂H₅ | " |

-continued

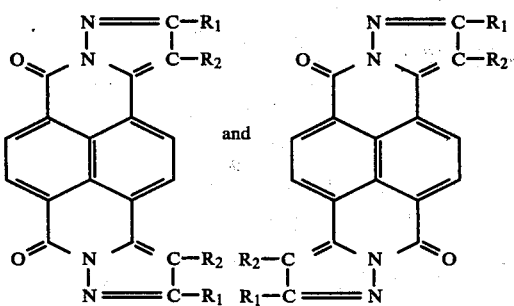
and

| Example | $R_1$ | $R_2$ | Colour shade (polyester) |
|---|---|---|---|
| 16 | $-CH_2-C_6H_5$ | $-COOC_2H_5$ | " |
| 17 | $-CH_2OCH_3$ | $-COOC_2H_5$ | " |
| 18 | $-CH(C_2H_5)C_2H_5$ | $-COOC_2H_5$ | " |
| 19 | $-C_6H_5$ | $-COCH_3$ | " |
| 20 | $-C_6H_5$ | $-CN$ | yellow |
| 21 | $-CH_3$ | $-CN$ | " |
| 22 | $-C_6H_5$ | $-CO-C_6H_5$ | reddish-tinged yellow |
| 23 | H | $-CO-C_6H_5$ | " |
| 24 | H | $-COCH_3$ | " |
| 25 | $-CH_3$ | $-COCH_2OC_2H_5$ | " |
| 26 | $-COOC_2H_5$ | $-COCH_3$ | " |
| 27 | $-CH_3$ | $-CONH-C_6H_4-OCH_3$ | " |
| 28 | $-CH_3$ | $-CONH-C_6H_4-CH_3$ | " |
| 29 | $-CH_3$ | $-CONH-C_6H_4-Cl$ | " |
| 30 | $-CH_3$ | $-CONH-C_6H_{11}$ | " |
| 31 | $-CH_3$ | $-CONH_2$ | " |
| 32 | $-CH_3$ | $-CONHCH_3$ | " |
| 33 | $-CH_3$ | $-CON(C_2H_5)_2$ | " |
| 34 | $-CH_3$ | $-CON(CH_3)_2$ | " |

-continued

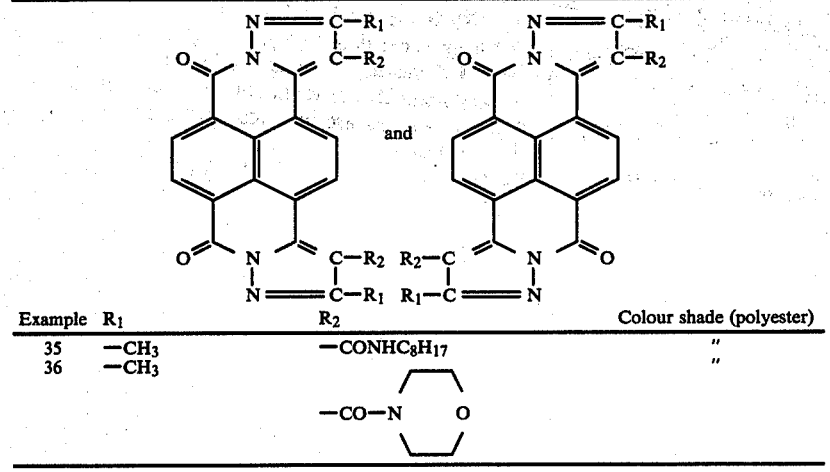

| Example | R₁ | R₂ | Colour shade (polyester) |
|---|---|---|---|
| 35 | —CH₃ | —CONHC₈H₁₇ | " |
| 36 | —CH₃ | —CO—N⟨OC₄H₈⟩ (morpholide) | " |

EXAMPLE 37

(a) 10 parts of hank material made of polyethylene glycol terephthalate are dyed at 96°–98° C. for two hours in a liquor consisting of 600 parts of water, 0.1 part of the dyestuff of Example 1, in the finely divided form, 3.4 parts of a mixture of o-, m- and p-cresotic acid methyl ester and 0.6 part of a mixture of equal parts of an aralkylsulphonate and a nonionic polyglycol ether, after adding sulphuric acid until the pH value has been adjusted to 4.5. The material is then rinsed and dried. The fastness to rubbing can be improved if the material is subjected to after-treatment for 10–30 minutes in a simmering bath which contains, per 1,000 parts of water, 5.5 parts of sodium hydroxide solution of Be strength 38°, 2 parts of sodium dithionite and 1 part of a polyglycol ether of a fatty acid amide. A clear reddish-tinged yellow dyeing with very good fastness properties is obtained.

(b) 10 parts of flocks made of polyethylene glycol terephthalate are dyed at 120°–130° C. for 2 hours in a liquor of pH 4.5 consisting of 400 parts of water and 0.15 part of the dyestuff prepared according to Example 1, in the finely divided form, and 0.3 part of a mixture of equal parts of an aralkylsulphonate and a non-ionic polyglycol ether. After rinsing and drying the flocks, a clear reddish-tinged yellow dyeing is obtained.

(c) A scoured and heat-set fabric made of polyethylene glycol terephthalate is printed with a paste consisting of the following components: 20 g of the dyestuff obtained according to Example 1, in the finely divided form, 520 g of water, 450 g of crystal gum 1:2 and 10 g of cresotic acid methyl ester.

In order to fix the dyestuff, the printed and dried goods are treated with hot air at 200° C. for 40 seconds. After soaping, rinsing and drying, a clear reddish-tinged yellow print with very good fastness properties is obtained.

EXAMPLE 38

0.1 g of the dyestuff described according to Example 1 is mixed with 100 g of polystyrene granules and the mixture is melted in an extruder at 200°–220° C. The bulk-dyed polystyrene is then extruded as a strand, cooled and granulated. The granular, dyed polystyrene is injection-moulded in a screw injection moulding machine to give reddish-tinged yellow shaped articles which are distinguished by good fastness to light. The dyestuff exhibits a good heat stability during the processing operation.

We claim:

1. Polycyclic dyestuff of the formula

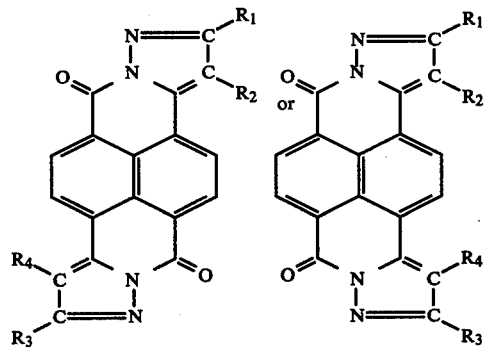

wherein $R_1$ and $R_3$ are hydrogen, $C_1$–$C_{20}$-alkyl, hydroxy-$C_1$–$C_{20}$-alkyl, cyano-$C_1$–$C_{20}$-alkyl, halo-$C_1$–$C_{20}$-alkyl, benzyl, phenylethyl, $C_1$–$C_{20}$-alkoxy-$C_1$–$C_{20}$alkyl, hydroxy-$C_1$–$C_{20}$-alkoxy-$C_1$–$C_{20}$-alkyl, cyano-$C_1$–$C_{20}$-alkoxy-$C_1$–$C_{20}$-alkyl, $C_1$–$C_4$-alkoxy-$C_1$–$C_{20}$-alkoxy-$C_1$–$C_{20}$-alkyl, halo-$C_1$–$C_{20}$-alkoxy-$C_1$–$C_{20}$alkyl, $C_1$–$C_{20}$-alkoxycarbonyl, hydroxy-$C_1$–$C_{20}$-alkoxy carbonyl, cyano-$C_1$–$C_{20}$-alkoxycarbonyl, $C_1$–$C_4$-alkoxy-$C_1$–$C_{20}$-alkoxy carbonyl, halo-$C_1$–$C_{20}$-alkoxycarbonyl, $C_1$–$C_{20}$-alkoxycarbonyl, $C_1$–$C_{20}$-alkoxycarbonyl-$C_1$–$C_{20}$-alkyl, hydroxy-$C_1$–$C_{20}$-alkoxycarbonyl-$C_1$–$C_{20}$-alkyl, cyano-$C_1$–$C_{20}$-alkoxycarbonyl-$C_1$–$C_{20}$-alkyl, $C_1$C–$C_4$-alkoxy-$C_1$–$C_{20}$-alkoxycarbonyl-$C_1$–$C_{20}$-alkyl, halo $C_1$–$C_{20}$-alkoxycarbonyl-$C_1$–$C_{20}$-alkyl, phenyl, $C_1$–$C_4$-alkylphenyl,$C_1$–$C_4$-alkoxyphenyl, halophenyl, or nitrophenyl; $R_2$ and $R_4$ are $C_1$–$C_{20}$-alkylcarbonyl, hydroxy-$C_1$–$C_{20}$-alkylcarbonyl, cyano-$C_1$–$C_{20}$-alkylcarbonyl, $C_1$–$C_4$-alkoxy-$C_1$–$C_{20}$-alkylcarbonyl, halo-$C_1$–$C_{20}$-alkylcarbonyl, phenylcarbonyl, $C_1$–$C_4$-alkylphenylcarbonyl, $C_1$–$C_4$-alkoxyphenylcarbonyl, halophenylcarbonyl, nitrophenylcarbonyl, $C_1$–$C_{20}$-alkoxycarbonyl, hydroxy-$C_1$–$C_{20}$-alkoxycarbonyl, cyano-$C_1$–$C_{20}$-alkoxycarbonyl, $C_1$–$C_4$-alkoxy-$C_1$–$C_{20}$-alkoxycarbonyl, halo-$C_1$–$C_{20}$-alkoxycarbonyl, cyano, or $CONX_1X_2$ wherein $X_1$ is hydrogen, $C_1$–$C_{20}$-alkyl, hydroxy-$C_1$–$C_{20}$-alkyl, cyano-$C_1$–$C_{20}$-alkyl, $C_1$–$C_4$-alkoxy-$C_1$–$C_{20}$-alkyl, halo-$C_1$–$C_{20}$-alkyl, benzyl, phenylethyl, phenyl, $C_1$–$C_4$-alkylphenyl, $C_1$–$C_4$-alkoxyphenyl, halophenyl, nitrophenyl, or cyclohexyl; and $X_2$ is hydrogen, $C_1$–$C_{20}$-alkyl, hydroxy-$C_1$–$C_{20}$-alkyl, cyano-$C_1$–$C_{20}$-alkyl, $C_1$–$C_4$-alkoxy-$C_1$–$C_{20}$-alkyl, or halo-$C_1$–$C_{20}$-alkyl.

2. Dyestuff of claim 1 wherein $R_1$ and $R_3$ are identical and $R_2$ and $R_4$ are identical.

3. Dyestuff of claim 1 wherein $R_1$ is $C_1$–$C_4$-alkyl;

$R_2$ is $C_1$–$C_4$-alkoxycarbonyl, $CONH_2$, $CONHY$, or $CONY_1Y_2$;

wherein $Y_1$ and $Y_2$ are $C_1$–$C_4$-alkyl;

$R_3$ is identical to $R_1$; and $R_4$ is identical to $R_2$.

4. Dyestuff of claim 3 wherein $R_1$ and $R_3$ are identical and are $C_1$–$C_4$-alkyl; and $R_2$ and $R_4$ are identical and are $C_1$–$C_4$-alkoxycarbonyl.

* * * * *